United States Patent

[11] 3,621,149

[72] Inventors Yoshiyo Wada;
Katsuya Yasutake, both of Yokohama, Japan

[21] Appl. No. 849,433
[22] Filed Aug. 12, 1969
[45] Patented Nov. 16, 1971
[73] Assignee Victor Company of Japan, Limited Yokahama, Japan
[32] Priority Aug. 13, 1968
[33] Japan
[31] 43/57114

[54] MAGNETIC TAPE TENSION CONTROL SYSTEM FOR MAGNETIC RECORDING AND REPRODUCING APPARATUS HAVING DUAL CAPSTANS

5 Claims, 5 Drawing Figs.

[52] U.S. Cl. 179/100.2 S, 178/6.6 P, 179/100.2 T, 242/209

[51] Int. Cl. G11b15/43, B65h 59/38

[50] Field of Search 179/100.2 S, 100.2 T; 178/6.6 FS, 6.6 P; 274/4 D, 11 D; 242/202, 203, 206, 207, 208, 209

[56] References Cited

UNITED STATES PATENTS

| | | | |
|---|---|---|---|
| 2,913,192 | 11/1959 | Mullin | 242/202 |
| 3,488,453 | 1/1970 | Chupity et al. | 179/100.2 T |
| 3,516,146 | 6/1970 | Maxey | 179/100.2 T |

*Primary Examiner*—Stanley M. Urynowicz, Jr.
*Assistant Examiner*—Robert S. Tupper
*Attorney*—Louis Bernat

ABSTRACT: A magnetic tape tension control system is shown for magnetic recording and reproducing apparatus of the so-called double capstan type in which a magnetic tape is moved by two capstans driven by a single motor through belts. The control system keeps a constant tension on the portion of the magnetic tape which is between the two capstans irrespective of the direction in which the tape is moved. This is done by varying the tension of the tape on the takeup reel side or supply reel side depending on whether the tape is moved in a normal direction or a reverse direction.

INVENTORS
YOSHIYO WADA
KATSUYA YASUTAKE
BY Louis Bernat
ATTORNEY

INVENTORS
YOSHIYO WADA
KATSUYA YASUTAKE
BY Louis Bernat
ATTORNEY

INVENTORS
YOSHIYO WADA
KATSUYA YASUTAKE
BY Louis Bernat
ATTORNEY

MAGNETIC TAPE TENSION CONTROL SYSTEM FOR MAGNETIC RECORDING AND REPRODUCING APPARATUS HAVING DUAL CAPSTANS

This invention relates to magnetic tape tension control systems in general.

More particularly, the invention is concerned with a magnetic tape tension control system for magnetic video signal recording and reproducing apparatus a so called double-capstan-type system uses a magnetic tape moved by two capstans which are driven by a single motor. The control system keeps a constant tension on a portion of the magnetic tape which is disposed between the two capstans irrespective of the direction in which the magnetic tape is moved.

Generally, the two capstans are driven by a single motor acting through two belts. The tape-driving rate of the capstan on the magnetic tape takeup reel side is selected to be equal to or slightly higher than the tape-driving rate of the capstan on the magnetic tape supply reel side. The portion of the magnetic tape which is disposed between the two capstans is tensioned in accordance with a difference between the tape-driving rates of the two capstans.

Actually, however, the rate of the magnetic tape movement on the takeup reel side is equal to that on the supply reel side. The difference between the tape-driving rates of the two capstans is caused by a slip between the playback. tape and the capstans. Thus, the portion of the magnetic tape disposed between the two capstans can be tensioned. A desired still picture position enables still playback by using this magnetic recording and reproducing apparatus of the double capstan type. The tape is moved both in the normal and reverse directions for slow-motion playback or reverse-motion playback Thus, it is necessary to decide upon the position in which still picture playback is effected.

If the direction of tape transport is reversed from the normal direction in this case, it upsets the aforementioned relation between the tape-driving rates of the two capstans with respect to the normal direction of the movement of the tape. This reduces the tension of the portion of the magnetic tape disposed between the two capstans when the tape moves in the reverse direction as compared to the tension when it is moving in the normal direction. In the worst case, the tape may become loosened.

Generally, if the tension of the tape varies when it is moved in the reverse direction as compared to the tension when it is moved in the normal direction, then the length of the tape is varied because of its contraction or expansion. The length of the reproduced tracks is thereby varied from the length of the recorded tracks. A difference in length caused by contraction or expansion of the tape causes an error in playback time, manifesting itself as a skewed distortion in the picture.

The present invention overcomes all the disadvantages of the prior art set forth above.

Accordingly, a principal object of the invention is to provide a magnetic tape tension control system for magnetic recording and reproducing apparatus of the double capstan type. Here, an object is to keep constant the tension of the portion of the magnetic tape disposed between the two, irrespective of the direction of movement of the tape.

Another object of the invention is to provide a magnetic tape tension control system which keeps a constant tension on the portion of the magnetic tape disposed between the two capstans irrespective of the direction of movement of the tape by using simple means to control reel motors and varying the torques exerted by them. The control is in accordance with the direction of movement of the magnetic tape.

Still another object of the invention is to provide a magnetic tape tension control system in which a simple switch means is used to control reel motors and vary the torques exerted by them. The switching is from normal to reverse movement of the magnetic tape. The magnetic heads can be maintained in engagement with the magnetic tape, in a stable manner, irrespective of the direction of movement of the tape.

Additional objects as well as features and advantages of the invention will become evident from the description set forth hereinafter when considered in conjunction with the accompanying drawings, in which.

Figure 1:
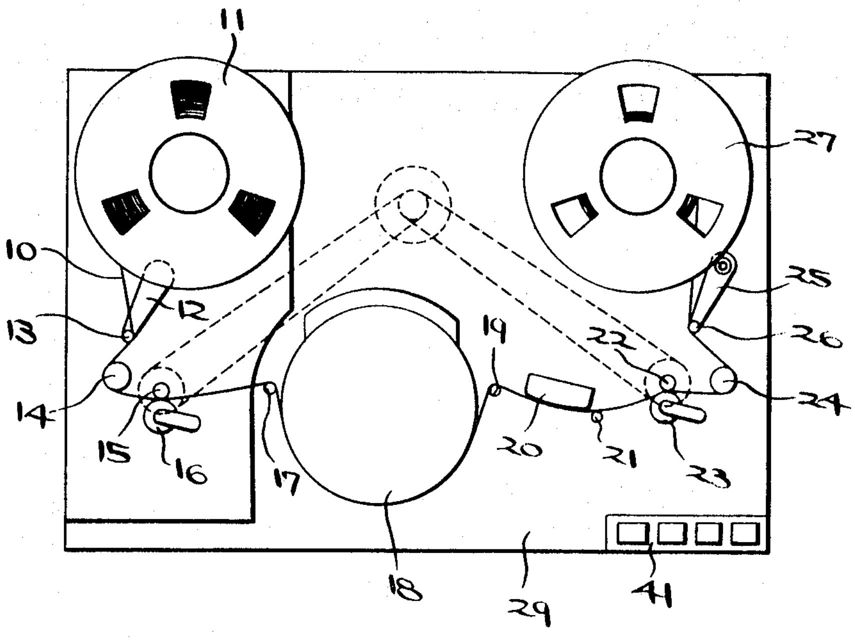
FIG. 1 is a schematic plan view of a video signal magnetic recording and reproducing apparatus in which the system according to this invention can be incorporated.
Figure 2:
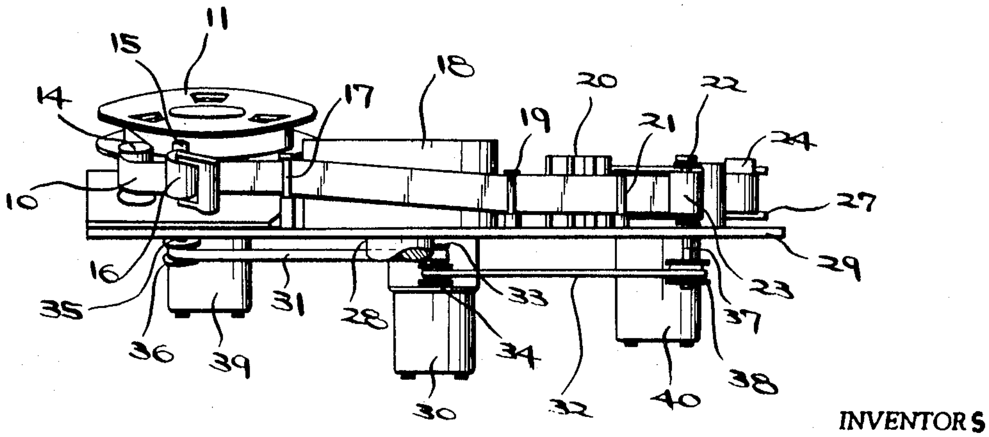
FIG. 2 is a schematic front view of the apparatus of FIG. 1.

FIGS. 1 and 2 shows one example of magnetic video signal recording and reproducing apparatus in which the system according to this invention can be incorporated. A magnetic tape 10 is paid out from a supply reel 11 and moved past a roller 13 having a tension arm 12 and a guide roller 14. The tape is held between a rotating first capstan 15 and a first pinch roller 16. Then it is moved past a first guide pole 17, around a guide drum 18 in oblique wrap for a distance corresponding to over one-half the circumference thereof. The guide drum has a plurality of built-in rotary magnetic heads comprising two magnetic heads for recording and reproducing video signals. Thereafter, the tape is moved past a second guide pole 19, and brought into contact with a fixed magnetic head block 20 for recording and reproducing sound and control signals. The tape then moves past a third guide pole 21, and held between a rotating second capstan 22 and a second pinch roller 23. Finally, the tape moves past a guide roller 24, a roller 26 having a tension arm 25, and wound on a takeup reel 27.

The rotary magnetic heads (not shown) are mounted inside the guide drum 18. These heads include a pair of magnetic heads for recording and reproducing video signals, and are disposed in positions which are diametrically opposed to each other on the peripheral surface of a rotary body. The body rotates on a shaft which is coaxial with the rotary shaft of a magnetic head drive motor 28. The heads are in a plane which is normal to the center line of the guide drum 18 which is and coincides with said rotary shaft of the drive motor.

The magnetic tape transport mechanism is mounted on the upper surface of a base plate 29. Mounted on the underside of said base plate 29 is a mechanism for rotating the two capstans 15 and 22. This mechanism is powered a single motor 30 acting through two belts 31 and 32. The construction and operation of this mechanism will be explained.

A pulley assembly comprising two pulleys 33 and 34 one overlying the other and directly connected to the same rotary shaft of the motor 30. The first capstan 15 is mounted on a rotary shaft 35. The lower end of shaft 35 has a first flywheel which also serves concurrently as a pulley 36. The second capstan 22 is mounted on a rotary shaft 37 which supports at its lower end a second flywheel that also serves concurrently as a pulley 38.

A first belt 31 is trained to run between the upper pulley 33 of the pulley assembly and the first flywheel pulley 36. A second belt 32 is trained to run between the lower pulley 34 of the pulley assembly and the second flywheel pulley 38. Rotational forces of the motor 30 are transmitted to the first and second capstans 15 and 22 through the pulleys 33 and 34 and said belts 31 and 32. This causes the capstans 15 and 22 to rotate in the same direction.

In this embodiment, the first pulley 36 and second pulley 38 are of the same diameter (diameter $\approx$ 184 millimeters). The upper pulley 33 of the pulley assembly has a diameter of about 109.2 millimeters, and the lower pulley 34 thereof has a diameter of about 110.4 millimeters.

The lower pulley 34 of the pulley assembly has a slightly larger diameter than the upper pulley 33. Therefore, the peripheral speed of the rotary shaft of the second capstan 22 is slightly higher than the peripheral speed of the rotary shaft of the first capstan 15. Capstan 15 is disposed on the tape supply reel side of the drum 18. (In this embodiment, the tape speed on the first capstan side is about 18.85 cm./sec., and the tape speed on the second capstan side is about 19.05 cm./sec.). This difference in peripheral speed causes proper slip to occur between the belt 31 and the first pulley 36 and the upper pulley 33 of the pulley assembly. The belt 32 slips at the second pulley 38 and the lower pulley 34 of the pulley assembly.

A proper slip occurs between the first pinch roller 16 and the first capstan 15 and between the second pinch roller 23 and the second capstan 22. Thus, the tape speed on the tape supply reel side and the tape speed on the tape takeup side are equalized and balanced. This maintains a proper tensile force in the portion of the magnetic tape 10 moving between the two capstans 15 and 22. As shown in FIG. 2, the supply reel 11 is driven by a supply reel drive motor 39. The takeup reel 27 is driven by a takeup reel drive motor 40. The supply reel drive motor 39 and the takeup reel drive motor 40 will be explained subsequently in detail with reference to the embodiment of this invention.

Figure 3:
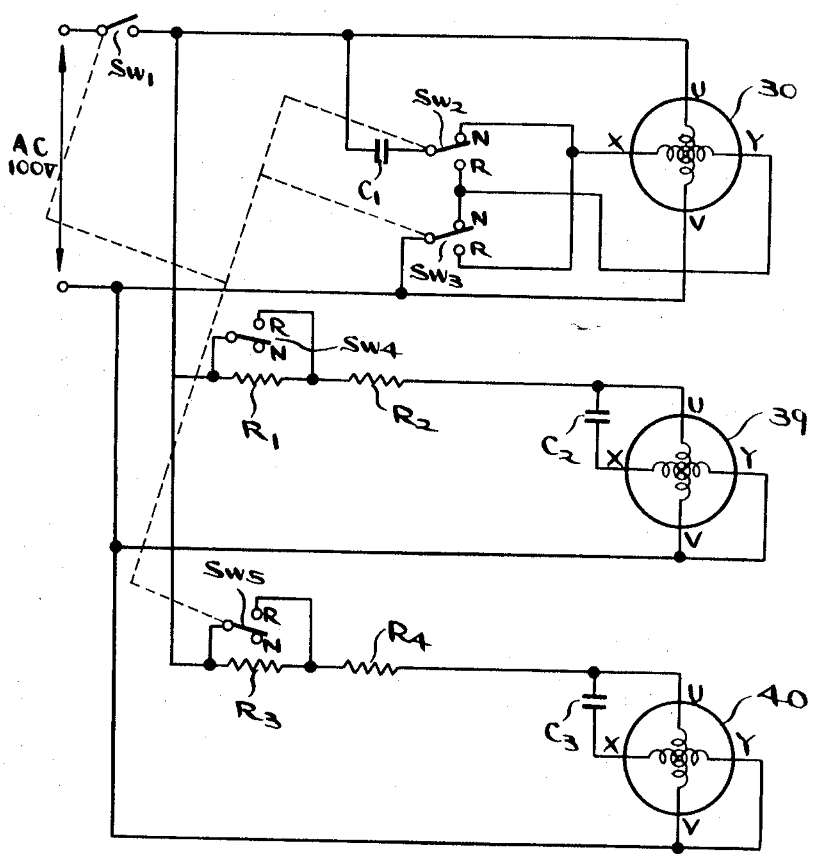
FIG. 3 is an electrical circuit diagram showing one example of the essential portions of the system according to this invention.
Figure 4:
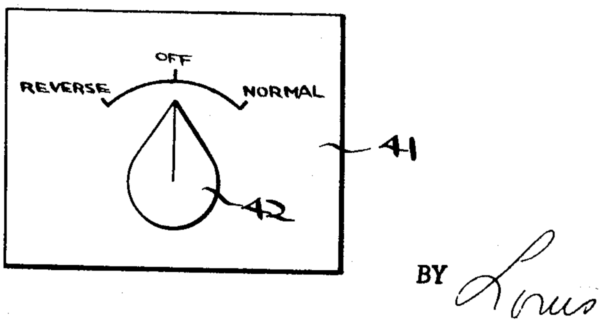
FIG. 4 is a plan view of essential portions of an operation section switch shown in FIG. 1.

FIG. 3 shows one embodiment of the system according to this invention. Switching is controlled by an operation knob 42 of an operation second 41 on the base plate 29. Switching is assumed to be from an "OFF" position to a "NORMAL" position (Fig. 4). A first switch $Sw_1$, controlled by the knob 42, is closed, to apply power from an AC power source of 100 volts across the main coil U–V of the capstan motor 30. Power is also applied across the auxiliary coil X–Y of the capstan motor, via a phase advance capacitor $C_1$ ($\approx 3\ \mu F$). A second switch $Sw_2$ coupled to the first switch $Sw_1$ is brought into engagement with an N contact. A third switch $Sw_3$ is coupled to the first and second switches $Sw_1$ and $Sw_2$ and brought into engagement with an N contact. This causes the capstan motor 30 to rotate in the normal direction.

The rotational force directed in a normal direction of the capstan motor 30 is transmitted to the capstans 15 and 22 through the belts 31 and 32. This causes the capstans 15 and 22 to rotate in the normal direction. The magnetic tape 10 held between the capstan 15 and the pinch roller 16 and between the capstan 22 and the pinch roller 23 can be moved in the normal direction.

The peripheral speed of the rotary shaft of the second capstan 22 is set at a level which is slightly higher than the peripheral speed of the rotary shaft of the first capstan 15. This speed differential causes a tensile force in the magnetic tape 10 moved around the guide drum 18. A slip of about 0.2 cm./sec. occurs in the magnetic tape 10 held between the first capstan 15 and the first pinch roller 16 on the supply reel side.

On the other hand, a fourth switch $Sw_4$ XXis coupled to the first, second and third switches $Sw_1$, $Sw_2$ and $Sw_3$ and is brought into engagement with and N contact. This applies power from the AC power source of 100 volts across the main coil U–V of the supply reel motor 39, through a resistor $R_1$ ($\approx 90\ \Omega$) and a resistor $R_2$ ($\approx 10\ \Omega$). The power is also applied across the auxiliary coil X–Y of the supply reel motor 39 through said resistors $R_1$ and $R_2$ and a phase advance capacitor $C_2$ ($\approx 14\ \mu F$). The supply reel motor is rotated in a predetermined direction.

A fifth switch $Sw_5$ is coupled to said second, third and fourth switches $Sw_1$, $Sw_2$, $Sw_3$. Switch $Sw_4$ is brought into engagement with an N contact to apply power from the AC power source of 100 volts across the main coil U–V of the takeup reel motor 40 through resistors $R_3$ ($\approx 50\ \Omega$) and $R_4$ ($\approx 50\ \Omega$). The power is also applied across the auxiliary coil X–Y of the takeup reel motor 40, through said resistors $R_3$ and $R_4$ and a phase advance capacitor $C_3$ ($\approx 14\ \mu F$). Thus, the takeup reel motor 40 is rotated in a predetermined direction.

A torque of about 1 kg. cm. is generated in each of the reel motors 39 and 40. Since the peripheral speed of the capstan on the takeup reel side is increased over that of the capstan on he supply reel side, a tensile force is applied to the magnetic tape in contact with the peripheral surface of the guide drum 18. This force is independent of the tensile force applied by the reel motors to the magnetic tape.

The takeup reel motor 40 pulls to tension the magnetic tape 10 in one direction. The supply reel motor 39 drops slightly and exerts a pull in a reversed direction, which also acts to tension the magnetic tape 10.

Now, if the operation knob 42 is switched from the "NORMAL" position to the "REVERSE" position (FIG. 4), the first switch $Sw_1$ coupled to said knob 42 is closed. Power from the AC power source of the 100 volts is applied across the main coil U–V of the capstan motor 30. Power is also applied across the auxiliary coil X–Y of the capstan motor through the phase advance capacitor $C_1$. The second and third switches $Sw_2$ and $Sw_3$ are brought into engagement with R contacts, whereby the capstan motor 30 is rotated in the reverse direction. Reverse rotation of the capstan motor 30 causes the capstans 15 and 22 to reverse their direction of rotation, which in turn causes the magnetic tape 10 to reverse its direction of movement.

A slack may form if the magnetic tape 10 is permitted to move in the reverse direction without controlling its rate of movement. The magnetic tape between the two capstans is loosened at a rate of 0.2 cm./sec., because the peripheral speed of the first capstan 15 is slightly lower than the peripheral speed of the second capstan 22 as described previously. The magnetic tape 10 in contact with the peripheral surface of the guide drum 18 is under lower tension when it is moving in the reverse direction than when it is moving in he normal direction. Thus, the load is reduced.

The slip between the pulley 33 and the belt 31 is reduced when the capstan motor 30 rotates in the reverse direction. Therefore, in the reverse direction, a force is at work to drive the capstan at a higher rate than when the capstan motor 30 rotates in the normal direction. There is a reduction in the tensile force applied to the tape between the second capstan 22 and the second pinch roller 23. Therefore, the rate of rotation of the second capstan is reduced. All of these factors combine to make it difficult to maintain a contact between the magnetic tape and the peripheral surface of the guide drum 18, and the same tension, when the tape is moved in the reverse direction as compared to its motion in the normal direction.

According to this invention, the tape transport control system controls tension in the portion of the magnetic tape which is disposed between the two capstans. The tape is under the same tension when it is moved in the reverse direction as when it is moved in the normal direction.

One embodiment of the system will be explained with reference to FIG. 3. Following the switching of the knob 42 to "REVERSE", the fourth switch $Sw_4$ (coupled to the first, second and third switches $Sw_1$, $Sw_2$ and $Sw_3$) is brought into engagement with an R contact. Power from the AC power source of 100 volts is applied across the main coil U–V the supply reel motor 39, through only the resistor $R_2$. At the same time, power from the AC power source of 100 volts is also applied across the auxiliary coil X–Y of the supply reel motor 39 through the resistor $R_2$ and phase advance capacitor $C_2$. This causes the supply reel motor 39 to rotate in a predetermined direction. At this time, the torque exerted by the supply reel motor 39 is about 4.5 kg. cm., which represents a large increase over the torque exerted thereby when the motor rotates in the normal direction, which is 1 kg.cm. At the same time, the fifth switch $Sw_5$ (coupled to the first, second, third and fourth switches $Sw_1$, $Sw_2$, $Sw_3$ and $Sw_4$) is also brought into engagement with an R contact side. This applies power from the AC power source of 100 volts to be applied across he main coil U–V of the takeup reel motor 40, through the resistor $R_4$ alone. Power is also applied across the auxiliary coil X–Y of the takeup reel motor 40, through the resistor $R_4$ and phase advance capacitor $C_3$. This causes the takeup reel motor 40 to rotate in a predetermined direction. At this time, the takeup reel motor 40 exerts a torque of about 1.6 kg. cm, which is slightly increased over the torque of 1 kg. cm. which it exerts when it rotates in the normal direction.

Thus, according to this invention, the torque exerted by the supply reel motor 39 is increased by the aforementioned torque control circuit means when the tape transport direction is reversed. The tension of the magnetic tape in contact with the peripheral surface of the guide drum 18 is lowered during the transportation of the tape in the reverse direction. This increase the tensile force applied to the magnetic tape 10. This increase in torque causes a slippage of about 0.2 cm./sec. to occur between the first capstan 15 and the first pinch roller 16. Thus, the magnetic tape 10 moves at a rate which is higher than the peripheral speed of the capstan 15.

Accordingly, a slippage occurs between the belt 31 and the upper pulley 33 of the pulley assembly. The magnetic tape 10 moves as if it were pulled by the driving force of the supply reel 11. At the same time, the aforementioned increase in the torque exerted by the takeup reel 40 causes an increase in the load applied by the moving tape to the second capstan 22 and the second pinch roller 23. The slippage occurs simultaneously between the capstan 22 and pinch roller 23 and between the belt 32 and the lower pulley 34 of the pulley assembly. This results in a reduction in the peripheral speed of the capstan 22 itself.

It will thus be appreciated that by controlling the supply reel motor 39 and takeup reel motor short-circuited and varying the torques exerted thereby, it larger possible to maintain a constant tension in the portion of the magnetic tape which disposed between the two capstans 15 and 22. Therefore, the tension is at the same level when the tape is moved in either the reverse direction or the normal direction.

Figure 5:
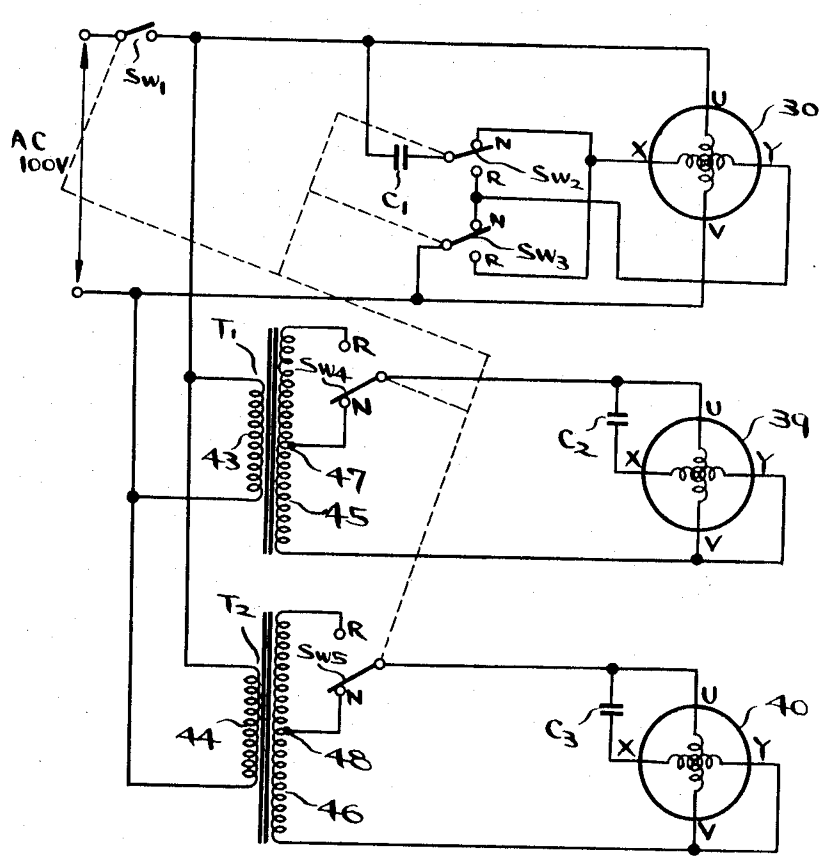
FIG. 5 is an electrical circuit diagram of another embodiment of the essential portions of the system according to this invention.

FIG. 5 shows another embodiment of this invention. The same reference characters designate similar parts in FIGS. 3 and 5. In this embodiment, the torques exerted by the supply reel motor 39 and takeup reel motor 40 are reduced when the magnetic tape is moved in the normal direction. Torque control is carried out by reducing the voltages applied to the motors below the level of the voltages applied to the motors when the tape is moved in the reverse direction. The torques exerted by the supply reel motor 39 and takeup reel motor 40 are increased when the magnetic tape is moved in the reverse direction. This is done by increasing the level of the voltages applied to the motors above the level of the voltages applied to the motors when the tape is moved in the normal direction.

More specifically, the knob 42 is switched to the "NORMAL" position to cause the tape to move in the normal direction. The first switch $Sw_1$, coupled to the knob, is closed, and the second switch and third switch $Sw_2$ and $Sw_3$ are brought into engagement with N contacts. Therefore, power from the AC power source of 100 volts is applied to the capstan motor 30 to cause the same to rotate in the normal direction. This operation of the capstan motor is similar to that described previously with reference to the first embodiment, so that detailed explanation of its operation is omitted.

On the other hand, power from the AC power source of 100 volts is applied to primary windings 43 and 44 of a first transformer $T_1$ and a second transformer $T_2$ respectively. At the same time, the fourth switch and fifth switch $Sw_4$ and $Sw_5$ are brought into engagement with N contacts. These contacts are connected to intermediate taps 47 and 48 of secondary windings 45 and 46 of the transformers $T_1$ and $T_2$, respectively. The AC voltages below the level of 100 volts are applied to the supply reel motor 39 and takeup reel motor 40 to cause the same to rotate.

Upon switching the knob 42 from the "NORMAL" position to the "REVERSE" position, the first switch $Sw_1$ is closed and the second and third switches $Sw_2$ and $Sw_3$ are brought into engagement with R contacts. Power is applied from he AC power source of 100 volts to the capstan motor 30 to cause the same to rotate in the reverse direction. On the other hand, the fourth and fifth switches $Sw_4$ and $Sw_5$ are brought into engagement with R contacts. Thus voltages, which are higher than the voltages applied when the tape is moved in the normal direction, are applied to the supply reel motor 39 and takeup reel motor 40. The voltages applied through the fourth and fifth switches $Sw_4$ nd $Sw_5$, to the motors 39 and 40 are higher than the voltages so applied when the tape is moved in the normal direction. Thus the reverse torques exerted by the reel motors 39 and 40 are higher than the torques exerted by them when the tape is moved in the normal direction. Thus, the results are similar in the first and second embodiments. A detailed explanation of the results of operation of this embodiment of the system according to this invention will be omitted.

The reel motors 39 and 40 are controlled so that the torques exerted by them can be varied in the embodiments described. It is to be understood that the torque of either one of the two reel motors may be made variable. The tape tension control system according to this invention maintains a constant tension in the portion of the magnetic tape which is disposed between the two capstans, regardless of the direction of the movement of the magnetic tape or the diameter of a coil of magnetic tape wound on the reel. The invention also permits the magnetic heads to be maintained in contact with the magnetic tape in a stable manner without being affected by the mode of movement of the magnetic tape. This makes it possible to reproduce signals in a stable manner and to eliminate skewing of the reproduced images. Degradation of the playback characteristics due to improper engagement of the magnetic heads with the magnetic tape can be obviated.

While the invention has been shown and described above with reference to preferred embodiments hereof, it is to be understood that there is no intention to limit the invention to the disclosed embodiments. The claims are intended to cover all equivalent structures, changes and modifications falling within the scope of this invention.

What we claim is:

1. A magnetic tape tension control system for magnetic recording and reproducing apparatus comprising a single capstan motor, means comprising two capstans engaging a magnetic tape for at all times driving said magnetic tape, information signal recording and reproducing means located between said two capstans for recording on and reproducing from said magnetic tape, means including a first reel motor and a supply reel normally rotating in a first direction to transport magnetic tape form said supply reel in a normal direction of tape movement, means comprising a second reel motor and a second reel normally rotating in said first direction to take up said magnetic tape on said second reel responsive to the tape movement in the normal direction, transmission means for respectively transmitting the rotational torque of said capstan motor to said two capstans, said transmission means including means for increasing the peripheral speed of the rotary shaft of the capstan on said second reel side as compared to the peripheral speed of the rotary shaft of the capstan on said supply reel side so as to apply a predetermined tension to a portion of the magnetic tape disposed between said two capstans when the tape movement is in the normal direction, switch means for operating said transmission means to change over the direction of the rotation of said capstan motor so as to cause said magnetic tape to move in either the normal direction of the or the reverse direction, and means responsive to the changeover of the capstan motor rotation and the reverse in direction by said switch means for increasing the voltage applied to said first reel motor as compared to the voltage applied to said first reel motor during the tape movement in the normal direction so as to keep constant the tension of the portion of the magnetic tape disposed between said two capstans regardless of the direction of the magnetic tape movement.

2. The magnetic tape tension control system as defined in claim 1 wherein aid information signal recording and reproducing means comprises a guide drum, means for moving said magnetic tape around the outer periphery of said drum for a distance corresponding to over one-half the circumference of the guide drum, said tape having an oblique wrap about said circumference with respect to the drum axis, said guide drum having built-in rotary magnetic heads for recording and reproducing video signals or the like.

3. A magnetic tape tension control system for magnetic recording and reproducing apparatus comprising a single capstan motor, means comprising two capstans engaging a magnetic tape for at all times driving said magnetic tape, information signal recording and reproducing means located between said two capstans for recording on and reproducing from said magnetic tape, means including a first reel motor and a supply reel normally rotating in a first direction to transport a magnetic tape from said supply reel in a normal direction of tape movement, means comprising a second reel motor and a second reel normally rotating in a first direction to take up said magnetic tape on said second reel responsive to the tape movement in the normal direction, transmission means for respectively transmitting the rotational torque of said capstan motor to said two capstans, said transmission means including means for increasing the peripheral speed of the rotary shaft of the capstan on said second reel as compared to the peripheral speed of the rotary shaft of the capstan on said supply reel side so as to apply a predetermined tension to a portion of the magnetic tape disposed between said two capstans when the tape movement is in the normal direction, switch means for operating said transmission means to change over the direction of the rotation of said capstan motor so as to cause said magnetic tape to move in either the normal direction or the reverse direction, voltage changing means responsive to the changeover of the capstan motor rotation and the reverse in direction by said switch means for changing the voltage applied to said first and second reel motors as compared to the voltage applied to said first and second reel motors during the tape movement in the normal direction wherein said voltage-changing means applies a greater voltage to said first reel motor than to said second reel motor so as to keep constant the tension of the portion of the magnetic tape disposed between said two capstans regardless of the direction of the magnetic tape movement.

4. The magnetic tape tension control system as defined in claim 3 wherein said voltage increase means comprises a first series circuit including said first reel motor and a plurality of resistors, as second series circuit including said second reel motor and a plurality of resistors, means for applying a voltage across said first and second series circuits respectively, and means responsive to the changeover of the capstan motor rotation to the reverse direction for respectively short circuiting a portion of series resistors of said first and second series circuits.

5. The magnetic tape tension control system as defined in claim 4 wherein resistance values of the short-circuited portion of said first series circuit are larger than resistance values of the short-circuited portion of said second series circuit.

* * * * *